Jan. 13, 1925.
R. H. SIEFKEN
FRUIT GATHERER
Filed May 6, 1924
1,522,841
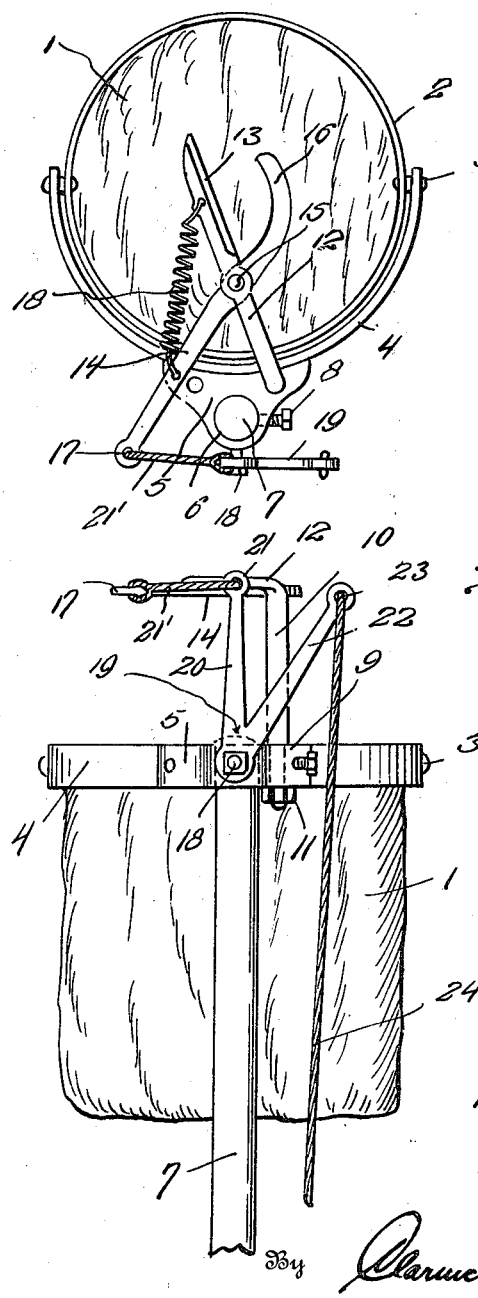

Patented Jan. 13, 1925.

1,522,841

UNITED STATES PATENT OFFICE.

RENKA H. SIEFKEN, OF MARSHALLTOWN, IOWA.

FRUIT GATHERER.

Application filed May 6, 1924. Serial No. 711,413.

*To all whom it may concern:*

Be it known that I, RENKA H. SIEFKEN, a citizen of the United States, residing at Marshalltown, in the county of Marshall and State of Iowa, have invented certain new and useful Improvements in a Fruit Gatherer, of which the following is a specification.

This invention relates to new and useful improvements in fruit gatherers and has reference more particularly to an improvement over my copending application bearing Serial No. 690,563, filed February 4, 1924.

One of the important objects of the present invention is to provide a fruit gatherer of the above mentioned character, wherein a pair of cooperating cutter blades is associated with the receptacle in such a manner as to clip the stems of the fruit to be gathered from trees, the receptacle being disposed below the cutter blades so as to receive the fruit as the same is severed from the trees.

A further object of the invention is to provide a fruit gatherer of the above mentioned character, wherein the cutter blades are adapted to be operated by a person standing on the ground so as to enable the person to gather the fruit from the trees when the fruit is out of the reach of the person.

A further object of the invention is to provide a fruit gatherer of the above mentioned character, wherein means is provided for normally holding the coacting cutter blades apart whereby the same are rendered operative at all times. A still further object of the invention is to provide a fruit gatherer of the above mentioned character, which is simple in construction, inexpensive, strong and durable and furthermore adapted for the purposes for which it is designated.

Other objects and advantages of this invention will become apparent during the course of the following description.

In the accompanying drawing forming part of this specification and in which like numerals designate like parts throughout the same:

Figure 1 is a top plan view of my improved fruit gatherer, and

Figure 2 is a side elevational view thereof with the supporting pole or handle and operating cable broken away.

In the drawing wherein for the purpose of illustration is shown the preferred embodiment of my invention, the numeral 1 designates a gathering receptacle which comprises a bag that may be readily collapsed whenever desired. The bag is held in an open position by means of the band or ring, the same being secured to the upper open edge in any well known manner. Extending outwardly from the band or ring 2 at diametrically opposite points are the pins 3 and the same provide a means for pivotally supporting the free end of a substantially semi-circular bail 4 in the manner clearly illustrated in the drawing and as more clearly set forth in my copending application.

Rigidly secured to the outer side of the bail 4 and arranged centrally thereon is the bracket 5. The outer end of the bracket 5 is provided with an enlarged opening such as is shown at 6 and adapted to be received therein is the upper end of an elongated handle or pole 7 which provides a supporting means for the receptacle. The upper end of the handle or pole is secured in position within the opening 6 provided in the bracket 5 by means of the set screw shown at 8 in the drawing.

The bracket 5 is further provided with an opening 9 through which extends the lower end of a vertically disposed arm 10. The lower end of the arm is threaded and receives thereon a nut 11 which provides a means for supporting the arm in a rigid position on the bracket 5. The upper end of the arm 10 is provided with an angular extension 12 and the same is substantially disposed inwardly over the bag or receptacle 1. The angular extension 12 is provided with a cutting edge such as shown at 13, and thereby forms what may be termed as a stationary cutter blade, the purpose of which will hereinafter be more fully described.

Pivotally supported intermediate its ends on the angular extension 12 is the elongated lever 14. The pivotal connection is illustrated at 15 in Figure 1 of the drawing. The inner end of the lever 14 is provided with a cutting edge such as is shown at 16 and the same is substantially curved for cooperation with the stationary cutter blade 13. The outer end of the lever 14 extends outwardly from the receptacle and the bracket 5 and is provided with an eye portion 17. For the purpose of normally keeping the cutter blades apart, I provide the coil spring 18, one end of which is fastened to the stationary cutter blade 13 while the other end of the coil spring is connected to the intermediate portion of the lever 17 adjacent the outer end thereof in the manner clearly illustrated in Figure 1 of the drawing.

Extending laterally from the bracket 5 is the bolt 18ª and the same provides a means for pivotally supporting on the bracket the substantially V-shaped lever 19. The upper end of one of the arms 20 of the V-shaped member 19 is provided with an eye 21 receiving one end of the short connecting cable 21'. The opposite end of the cable 21' is connected with the eye 17, at the outer end of the lever 14. The other arm 22 of the V-shaped member 19 is also provided with an eye 23 adapted to receive the upper end of an actuating cable 24. The actuating cable extends downwardly adjacent the elongated handle or pole 7 and provides a means for operating the pivoted cutter blade in the manner to be presently described.

In use, the handle 7 is raised so as to place the cutter blade over the fruit to be severed from the trees on opposite sides of the stem of the fruit. The actuating cable 24 is then pulled downwardly so as to swing the V-shaped member 19 on its pivot 18ª whereby the outer end of the elongated member 14 is moved in the direction in which the V-shaped member is swung so as to cause the cutter blade 16 to be brought into co-operation with the stationary cutter blade 13 whereby the stem of the fruit is clipped and the fruit will drop into the bag or receptacle 1. When the actuating cable 24 is released, the spring 18 will return the cutter blades to their normal separated positions thereby again placing the cutter blades in an operative position for engagement with other stems of the fruit on the tree to be severed. When the receptacle 1 has been filled, the device is lowered for permitting the depositing of the fruit from the receptacle into a larger container or the like.

It will thus be seen from the foregoing description, that a fruit gatherer has been provided which is simple in construction, inexpensive, strong and durable and the parts so arranged as to enable a person to easily and efficiently operate the cutter blade in such a manner as to sever the fruit from the trees without injuring the fruit.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A fruit gatherer comprising a substantially semi-circular bail, for supporting a receptacle, the intermediate portion of said bail being provided with a bracket, said bracket being provided with an opening for reception of the upper end of a supporting handle, the bracket being also provided with another opening, an arm having a down-turned portion, the free end of said down-turned portion being screw threaded and extended through the second named opening in said bracket, the upper portion of said arm being directed laterally to overlie the receptacle, a lever pivotally connected intermediate its ends to the laterally directed portion of said arm, a coil spring connected at one end to said lateral portion, and at its opposite end to the intermediate portion of said lever, a bell crank pivotally mounted on said bracket, a flexible connection between one arm of said spring and the outer end of said lever, and a pull cable connected with the remaining arm of said crank.

In testimony whereof I affix my signature.

RENKA H. SIEFKEN.